United States Patent
Cohen et al.

(10) Patent No.: US 6,550,055 B1
(45) Date of Patent: Apr. 15, 2003

(54) METHOD AND APPARATUS FOR CHEATING AN INFORMATION REPORT RESULTING FROM A DIAGNOSTIC SESSION

(75) Inventors: Paul M. Cohen, Beaverton, OR (US); Joseph R. Kluck, Portland, OR (US); William J. Nerenberg, Hillsboro, OR (US); David E. Dent, Portland, OR (US); Sanjay V. Vora, Hillsboro, OR (US)

(73) Assignee: Intel Corp., Santa Clara, CA (US)

( * ) Notice: Subject to any disclaimer, the term of this patent is extended or adjusted under 35 U.S.C. 154(b) by 0 days.

(21) Appl. No.: 09/222,074

(22) Filed: Dec. 29, 1998

(51) Int. Cl.[7] .................................................. G06F 9/44
(52) U.S. Cl. ........................ 717/124; 717/126; 707/3; 707/4
(58) Field of Search ................. 717/4, 7, 8, 9, 717/114, 127, 132, 144, 124, 122, 131; 709/203; 707/3, 4, 10, 6, 5; 702/108, 183

(56) References Cited

U.S. PATENT DOCUMENTS

| | | | | |
|---|---|---|---|---|
| 4,315,309 A | * | 2/1982 | Coli | 705/3 |
| 5,107,497 A | * | 4/1992 | Lirov et al. | 714/26 |
| 5,265,065 A | * | 11/1993 | Turtle | 707/4 |
| 5,272,704 A | * | 12/1993 | Tong et al. | 714/26 |
| 5,319,775 A | * | 6/1994 | Loges et al. | 714/31 |
| 5,500,941 A | * | 3/1996 | Gil | 714/38 |
| 5,539,869 A | * | 7/1996 | Spoto et al. | 707/500 |
| 5,752,242 A | * | 5/1998 | Havens | 707/3 |
| 5,778,357 A | * | 7/1998 | Kolton et al. | 707/2 |
| 5,802,515 A | * | 9/1998 | Adar et al. | 707/5 |
| 5,835,770 A | * | 11/1998 | Shum et al. | 717/4 |
| 5,931,877 A | * | 8/1999 | Smith et al. | 701/29 |
| 5,974,412 A | * | 10/1999 | Hazlehurst et al. | 707/3 |
| 5,983,218 A | * | 11/1999 | Syeda-Mahmood | 707/3 |
| 5,996,090 A | * | 11/1999 | Hellerstein | 714/25 |
| 6,023,583 A | * | 2/2000 | Honda | 717/158 |
| 6,141,699 A | * | 10/2000 | Luzzi et al. | 709/331 |
| 6,145,098 A | * | 11/2000 | Nouri et al. | 714/31 |
| 6,154,766 A | * | 11/2000 | Yost et al. | 709/201 |
| 6,202,070 B1 | * | 3/2001 | Nguyen et al. | 707/104 |
| 6,236,996 B1 | * | 5/2001 | Bapat et al. | 707/9 |
| 6,249,755 B1 | * | 6/2001 | Yemini et al. | 702/183 |
| 6,456,622 B1 | * | 9/2002 | Skaanning et al. | 370/389 |

OTHER PUBLICATIONS

Uckun et al, "A belief management architecture for dignostic problem solving", ACM pp 519–527, 1990.*

Limbek, "Generic diagnostic knowledge acquistion tool", ACM pp 772–777, 1988.*

Subtil et al, "A fuzzy information retrieval and management system and its applications", ACM pp 537–541, 1996.*

Turtle et al, "Evaluation of an inference network based retrieval model", ACM Trans. on Inf. Sys., vo. 9, No. 3, pp 187–222, Jul. 1991.*

Brajnik et al, Evaluatiing user interface to information retrieval system: a case study on user support, ACM SIGIR, pp 128–136, 1996.*

"Desktop Management Interface Specification" Version 2.0s, *Desktop Management Task Force, Inc.*, Jun. 24, 1998.

* cited by examiner

Primary Examiner—Anil Khatri
(74) Attorney, Agent, or Firm—Kenyon & Kenyon

(57) ABSTRACT

A method and device are provided for creating an information report for a computer system. An information report is used to signal a problem with a computer system and to provide information about the problem. The information report contains only relevant information, thereby decreasing the bandwidth required to send the information report, and the time required for a technician to review the information report. Information about the problem with the computer system is input by a user of the computer system. This information, together with information stored in a diagnostic tree, is used to limit the scope of an automatic information retrieval. An information report is produced from the results of the automatic information retrieval.

20 Claims, 3 Drawing Sheets

METHOD AND APPARATUS FOR CREATING AN INFORMATION REPORT RESULTING FROM A DIAGNOSTIC SESSION

BACKGROUND OF THE INVENTION

The present invention pertains to the creation of an information report as a result of a diagnostic session.

Diagnostic and information retrieval sessions performed on machines, including computers, can produce varying amounts of information about the machines. This information can range from a simple identification of a machine, to a report of whether the machine has a problem, to a detailed report of the nature and status of all the machine's systems. Diagnostic sessions and information retrievals can be performed manually, automatically, or as a combination of the two. An example of a manual diagnostic session is when a user answers a series of queries about, for example, a computer system the user is operating. An automatic diagnostic session or information retrieval can perform an information retrieval function, for example, on a computer system by a software program residing either on the computer system, or on another system (in communication with the first system), which obtains and copies information about the computer system. This information may then be sent, for example, to an interpreter such as a technician responsible for processing the information and taking an appropriate action based on the information. The information may be sent, for example, over a network such as a Local Area Network or the Internet.

As diagnostic sessions and information retrievals performed on machines become more and more automated, they can be performed much faster. Unfortunately, however, automated diagnostic sessions performed on complicated machines have tended not to provide the precise information needed by the interpreters of these diagnostic sessions.

The interpreter of a diagnostic session examines the results to try to determine (1) whether a problem exists, and (2) the cause of any problem identified. In current systems, diagnostic session results (called "information reports") are either extremely simple, only identifying the machine and indicating that a problem exists, or the results are extremely complex, including information about the nature and status of all the systems of the machine. This is particularly true in the field of computers, where automatic diagnostic sessions are frequently performed when a user identifies a problem or attempts to make changes to the system (e.g. installing new hardware).

The simple information report provides very little information to the interpreter, and provides almost no assistance in solving the problem. The detailed information report provides so much information that its usefulness is impaired. Transmission of the detailed information report consumes a lot of transmission bandwidth, and storage of the detailed information report can occupy excessive system memory resources. Furthermore, the detailed information report provides excess information that the interpreter must sort in order to select the specific information needed to diagnose the problem, consuming a lot of interpreter time.

SUMMARY OF THE INVENTION

According to an embodiment of the present invention, a method is provided for creating an information report for a computer system comprising the steps of posing a query to obtain one of a user response and a computer information response, providing a diagnostic tree having at least one node, selecting a node on the diagnostic tree based on one of said user response and said computer information response, and based on a characteristic of the node, selecting a portion of computer information.

DETAILED DESCRIPTION

The present invention relates to a user help system for assisting a user experiencing a problem with a computer system. More specifically, a method and device are provided for creating an information report which efficiently provides information to an interpreter of the information report such as a technician attempting to diagnose and solve a user's computer problem. An embodiment of the invention is described as including modules that operate functionally as described below. Those skilled in the art will appreciate that the modules may be implemented through either hardware, software, or a combination of both.

Figure 1:
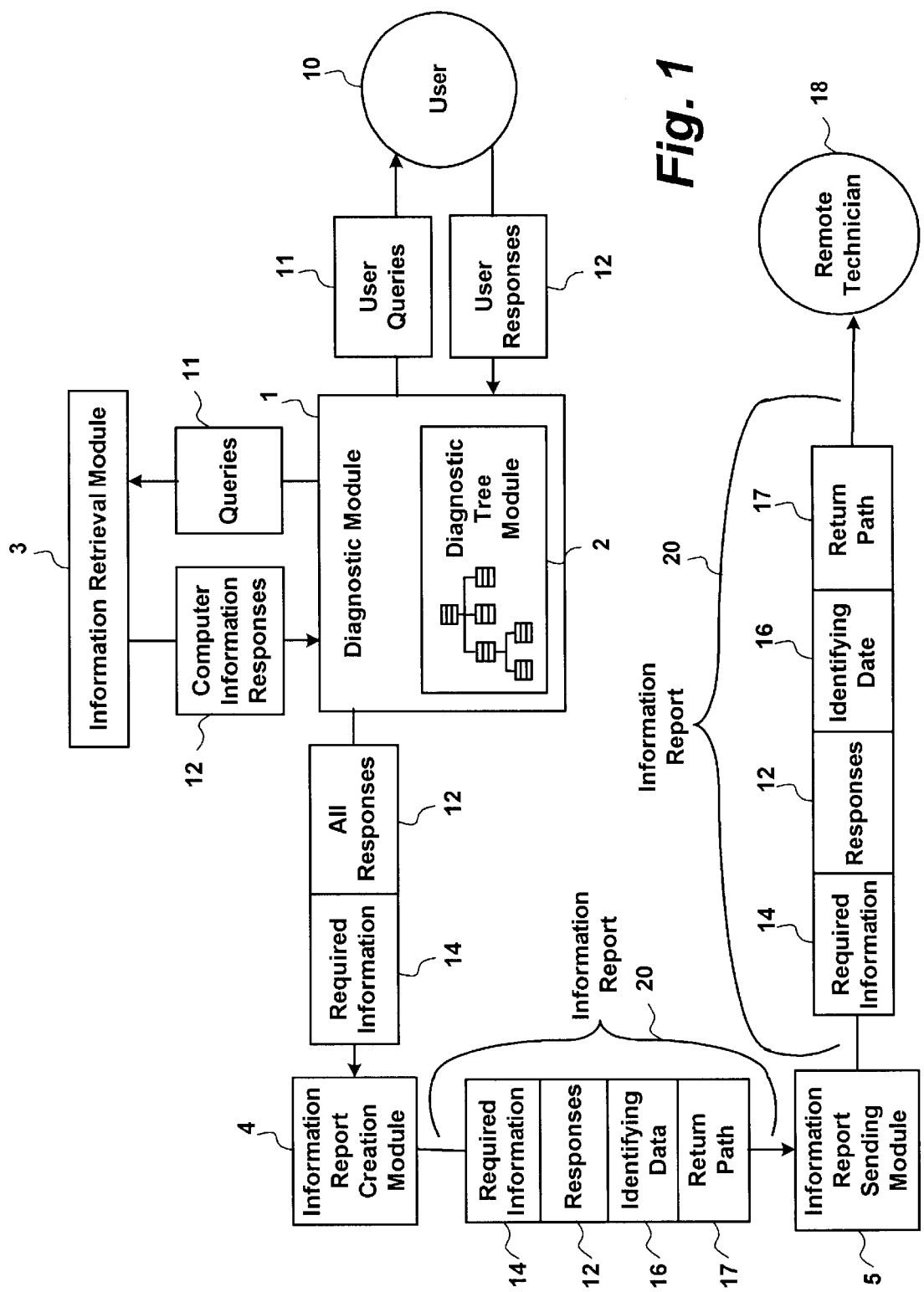
FIG. 1 is a schematic diagram of an embodiment of the present invention.

Referring to FIG. 1, a diagram of a user help system including an embodiment of the present invention is shown. In FIG. 1, the components of the user help system are described as modules. In this embodiment, a user 10 of a computer system is able to obtain a solution to a problem the user is having with the computer system. A user experiencing a problem with a computer system will initiate the user help system shown in FIG. 1, and a solution to the user's problem can be provided. The information retrieval module 3 automatically retrieves comprehensive information about the user's computer system. The information retrieval module 3 automatically queries the operating system and various components of the computer system to determine the characteristics and current status of the components of the system. The information retrieval module 3 may return a large amount of data about many hardware and/or software aspects of the computer system. An example of a known information retrieval module 3 is the Desktop Management Interface (DMI) described in Desktop Management Interface Specification Version 2.0s, Jun. 24, 1998, Desktop Management Task Force (DMTF) c/o MacKenzie Kesselring, Inc., 300 SW Market, Suite 450, Portland, Oreg. 97201. In this example of an information retrieval module, the DMI provides application programming interfaces (APIs) to inquire into the status of various components or sub-systems within the user's computer system. The APIs cue the operating system (e.g., a Microsoft Windows® 95 operating system) to run a performance test and deliver the results to the DMI. The DMI, which is capable of running on any operating system, then provides these results in a standard format. As described below, the information retrieval module 3 stores the results of its automatic information retrieval so that the diagnostic module 1 can query the results.

A diagnostic module 1 includes a diagnostic tree module 2. The diagnostic tree module may be implemented, for example, in Extensible Markup Language ("XML"). XML is a structured web language with information tags. In an embodiment of the present invention, the diagnostic module 1 performs a user diagnostic session and an automatic diagnostic session. In the automatic diagnostic session, the diagnostic module 1 poses queries 11 to the information retrieval module 3 and the information retrieval module 3 sends back responses 12. These responses (known as computer information responses) 12 enable the diagnostic module 1 to determine the nature of the user's problem and also to select certain information from the results of the automatic information retrieval to send out in an information report. If the information retrieval module 3 can answer a query 11, it provides a computer information response 12 to the diagnostic module 1. Queries 11 that the information retrieval module 3 cannot answer may be posed to the user 10 in a user diagnostic session.

In the user diagnostic session, the user provides information (user responses 12) to the user diagnostic module 1 to define the user's problem and to answer questions about the system that the automatic information retrieval module cannot answer. The user provides the information by answering a series of user queries 11 posed by the diagnostic module 1. The user responses 12 to the user queries 11 determine the next action by the diagnostic module 1. The user may be presented with a piece of information (such as a proposed solution), the diagnostic module 1 may pose another query to the information retrieval module 3 or the user 10, or the user diagnostic session may be terminated. Queries are posed first to the information retrieval module 3 to attempt to have the query automatically answered. If the information retrieval module 3 does not contain the answer to the query, the query is posed to the user 10.

Figure 2:
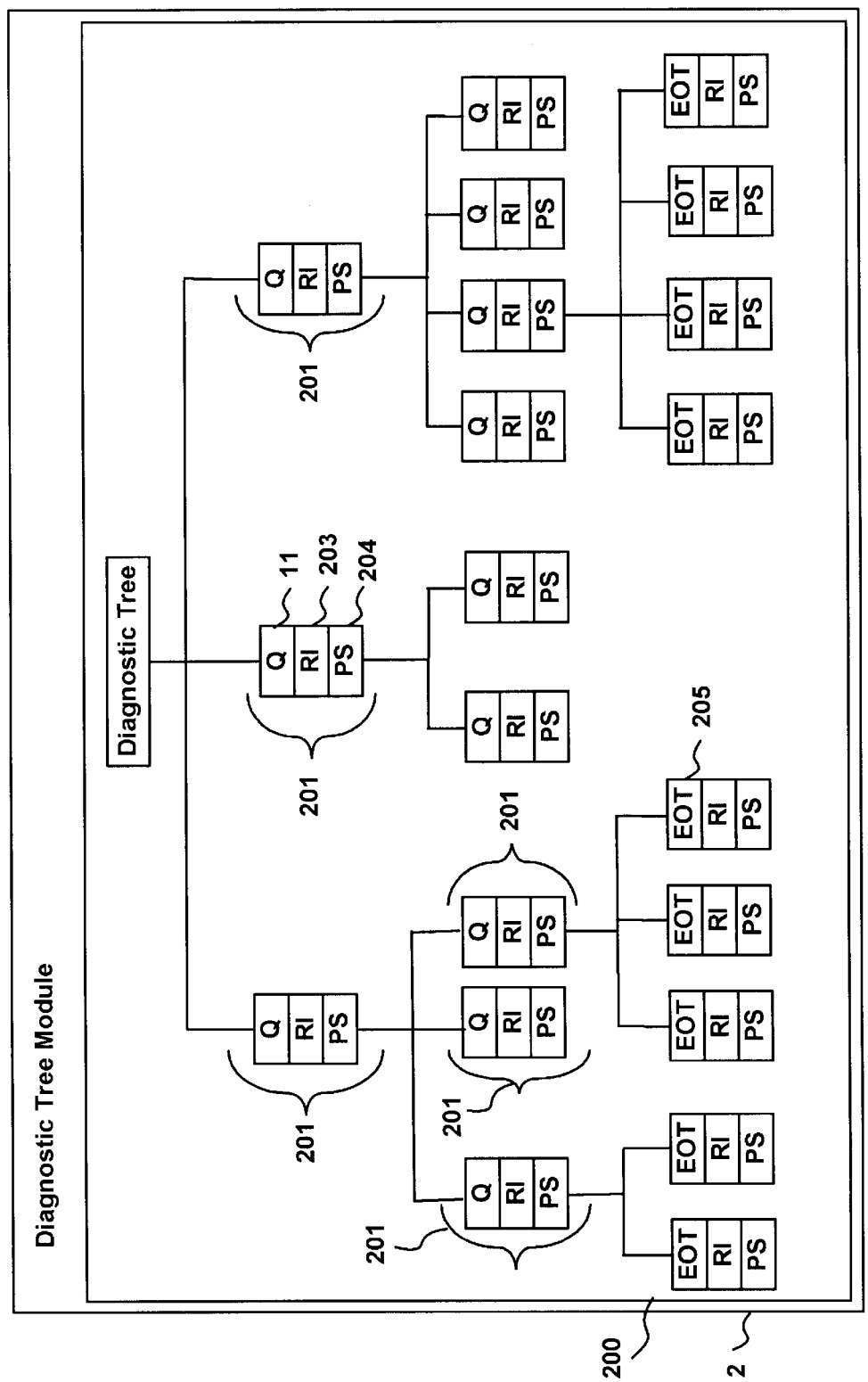
FIG. 2 is a schematic diagram of the Diagnostic Tree Module of FIG. 1.

The queries 11 posed to the user 10 and the information retrieval module 3 are from nodes on a diagnostic tree that is included in the diagnostic tree module 2. The structure of the tree enables the diagnostic module 1 to provide relevant information to the user 10 and to narrow the scope and amount of information to be sent to a remote technician. An example of a diagnostic tree module 2 including a diagnostic tree 200 is shown in FIG. 2. The diagnostic tree module of FIG. 2 includes nodes 201 that are linked together in a tree structure. Each node includes information about a particular problem (or a part of a problem) that a user may have with a computer system. The tree may have a dynamic structure, such that as new problems are encountered and solved, new nodes are added to the tree. Each node may include a description of a problem, a query to obtain information about the computer system or the problem the user is having (query 11, shown as "Q" 11 in FIG. 3), a list of required information "RI" 203 particular to the problem, and possible solutions "PS" 204 to the user's problem. The required information 203 is a list of information that must be obtained from the user, or automatically from the computer in order to solve the problem presented by the node 201. The possible solution 204 is instructions to the user 10 that the user may implement to attempt to solve the problem. While a multi-node diagnostic tree is described to illustrate an embodiment of the invention, it is to be understood that the diagnostic tree module may include a diagnostic tree with only a single node, or multiple nodes that are not organized in a tree structure (e.g., a "flat file" structure). In this case, the node may contain a query, a series of queries, or a decision rule for the selection of information from the information retrieval module 3 (e.g., return information only if a query is answered in the negative). It is to be understood that the term "diagnostic tree" includes single-branch branch trees or other structures where nodes are not technically arranged in a tree format (e.g., a linear arrangement).

When the diagnostic tree module 2 is activated, it begins parsing through the tree 200, posing the query 11 of each node to first the information retrieval module 3. If the information retrieval module 3 has an answer to the query 11, it returns a response 12 with the requested information. If the desired information was not obtained (or not obtainable) by the automatic information retrieval module, the query 11 is posed to the user as a user query 11. The user query 11 prompts the user to input information which the tree 200 will use to determine what action the diagnostic module 1 will take next. The diagnostic module 1 may present a possible solution 204 to the user 10, search the nodes 201 in the next level, or terminate the diagnostic session.

An "active" node 201 of the diagnostic tree 200 is the node which provides the next query 11 for the information retrieval module 3 or the user 10. After providing a query 11 and receiving a response 12 from either the information retrieval module or the user, the diagnostic tree module 2 may provide a possible solution 204, to the user 10, if the active node 201 contains a possible solution. Each node 201 may contain a single or multiple possible solutions, or none at all. The possible solution 204 may instruct the user to take some action to attempt to solve the problem. The user may be required to exit the diagnostic session to implement the possible solution 204. In this case, the diagnostic tree module saves information about the last active node 201 and all the responses 12 received to that point so that if the possible solution does not work, the user may re-enter the diagnostic tree at the point where the user left it and continue with the diagnostic session. If the user is successful in solving the problem by implementing the possible solution 204, the user may report this to the diagnostic session module, and the diagnostic session will terminate. If the user is not successful, the user will report this result to the diagnostic module 1 and the diagnostic session will continue. Alternatively, the possible solution may contain an instruction for the computer system to perform some action to automatically solve the problem, or one or more possible solutions may be incorporated into the information report.

After the user completes the instructions contained in any possible solution 204, if the problem is not solved the diagnostic tree module 2 uses the response 12 it received to the query 11 (from either the user 10 or the automatic information retrieval module 3) and the information that the problem was not solved, to find a new active node by searching the next level of the diagnostic tree 200.

All nodes 201 are shown as containing fields for user queries 11, required information 203, and possible solutions 204. It is understood, however, that some of these fields may be empty or not present for some nodes 201. For example, nodes 201 at the top of the diagnostic tree 200 are less likely to contain possible solutions 204 than nodes 201 closer to the bottom of the diagnostic tree 200 because the higher nodes 201 represent more general stages of problem definition, and the problems get more specific as the nodes 201 get closer to the bottom of the tree.

After a response 12 to a query 11 is received, and any possible solutions have been implemented, the diagnostic tree 200 searches for the next active node 201. The diagnostic tree 200 matches the response 12 to a node 201 in the next level of the tree by comparing the response to key words contained in each node 201 to which the active node 201 is connected. When a match is found, the matched node 201 is selected as the next active node 201. The diagnostic tree 200 then determines the information associated with the active node 201 (e.g. possible solutions of the user's problem 204, a query 11 to pose to the information retrieval module 3, or an end of tree marker 205). This process continues until a solution to the user's problem is found, the end of the diagnostic tree 200 is reached, or the user terminates the diagnostic module 1.

The diagnostic tree 200 may be designed to re-balance each time the user inputs information, so that the goal of posing the fewest number of queries to the user per problem is achieved. For example, a single question may be found simultaneously on multiple nodes 201 of the diagnostic tree 200. The response to this question (from the user 10 or the information retrieval module 3) could eliminate whole sub-trees for that diagnostic session, thereby limiting the number of potential user queries 11 that might be posed to the user.

When there are no more queries to be presented to the user 10 or the information retrieval module 3, and any proposed solutions are exhausted, the diagnostic module terminates. Additionally, at any time during the user diagnostic session, the user may decide to stop answering queries, terminate the user diagnostic session, and request help from a remote technician. The diagnostic module 1 then poses any remaining queries in the relevant sub-tree of the diagnostic tree 200 to the automatic information retrieval module 3. When any responses from the information retrieval module 3 to these queries 11 have been received, the diagnostic module 1 sends all received responses 12 (from the user 10 and the information retrieval module 3) and required information 14 to an information report creation module ("report creator") 4.

The information report creation module 4, links the responses 12 and the required information 14 together with the other information to be included in an information report. This information report is a packet of information indicating that a user has a problem with a computer system, and providing relevant information to the recipient of the information report (e.g. a remote technician). An information report 20 is created by linking the responses 12 with information such as the following: required information 14 from the diagnostic module 1, identifying data 16 of the computer system and the user that is retrieved during the automatic diagnostic session, and a designated return path 17 for the technician to help the user solve the user's problem (e.g. a telephone number or electronic mail (E-mail) address). Once an information report 20 is created, the report creator 4 sends the information report 20 to the information report sending module 5.

By including in the information report only the portion of the information from the automatic information retrieval session that is responsive to the queries posed by the diagnostic module 1, the scope of the information report is limited to only relevant information. As the diagnostic session proceeds through the diagnostic tree 200, some queries will be answered by the user, and some by the information retrieval module 3. Because the nodes 201 are organized in a tree structure, the user's responses 12 to queries 11 will help eliminate sub-trees, and therefore, restrict the queries 11 that are posed to the information retrieval module 3. Depending on how the diagnostic tree is designed, there may be more queries 11 for the user 10 at the top of the diagnostic tree 200, or the user queries 11 may be more toward the bottom, or user queries 11 and queries 11 for the information retrieval module 3 may be evenly interspersed. The particular construction of the diagnostic tree 200, therefore, and the placement of the nodes 201 have a significant influence over what information and how much information from the automatic information retrieval session is included in the information report 20.

In another embodiment of the present invention, the scope of the automatic information retrieval is limited by the information input during a user diagnostic session. In this case, the user queries 11 are performed first, and then based on the position of the final node reached in the tree 200, a limited automatic information retrieval session is performed. That is, the information retrieval module 3 only performs automatic queries of the computer system that are specified as relevant by the information obtained from the user with the diagnostic tree. Therefore, the limited diagnostic session only collects relevant information, which (along with the user-supplied information) is sent to the remote technician or diagnostic computer.

The information report sending module 5 sends the information report 20 to a remote technician 18. The information report 20 may be sent, for example, via an Internet connection of the user's computer system. In alternative embodiments of the present invention, the information report 20 may be sent to a local technician across a local area network (LAN). An information report may also be displayed or printed directly by the user's computer system. The user receives a response from a remote technician after the remote technician has studied the information report 20. This response may be through, for example, a telephone call, an E-mail message, a fax, or through any other communication method. Alternatively, a remote or a local technician may directly access the user's computer system to read the information report 20 or to fix the problem.

Figure 3:
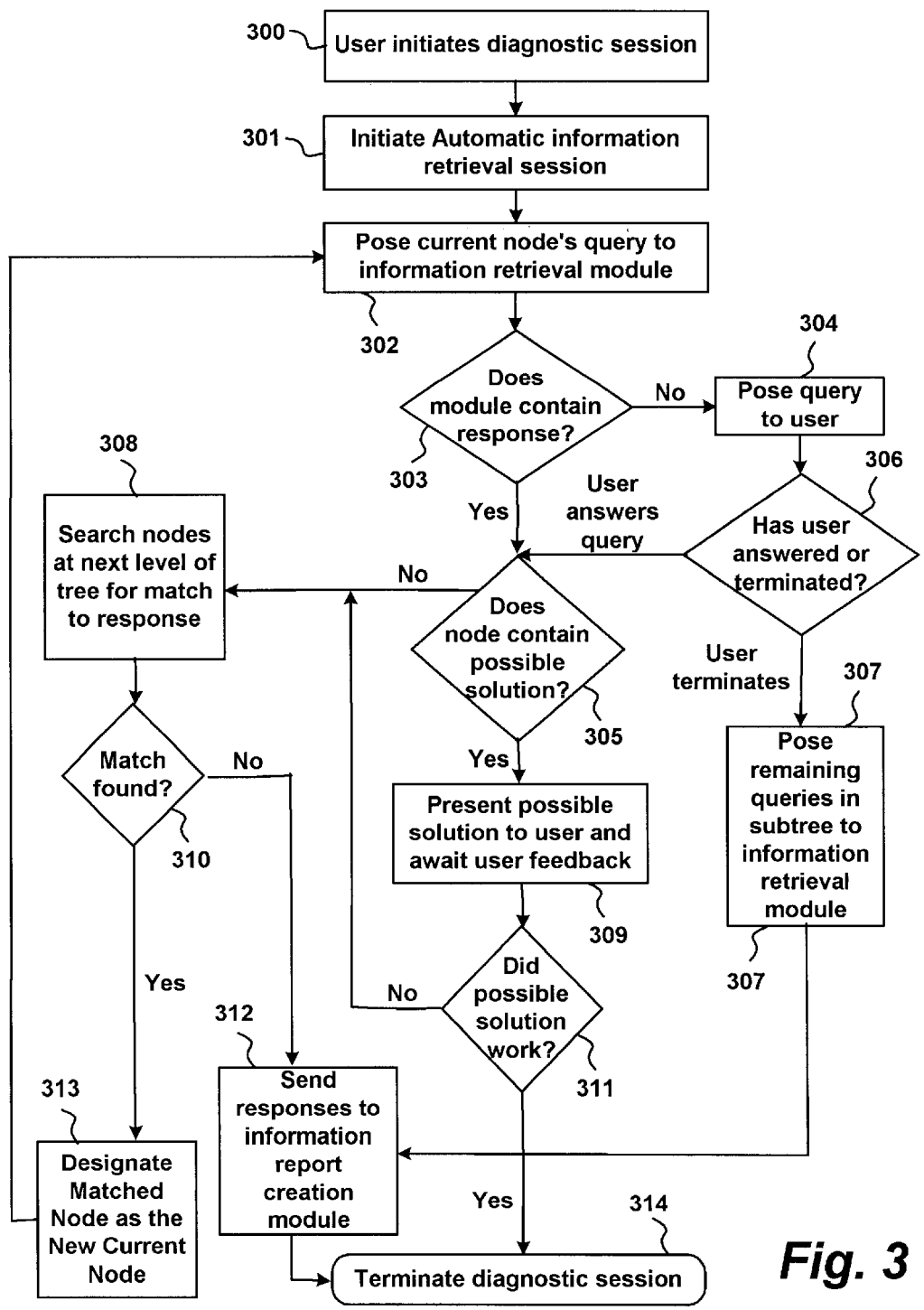
FIG. 3 is a flow chart of a method implemented by the User Diagnostic Session Module of FIG. 1.

FIG. 3 shows a flow chart of an embodiment of the method implemented by the diagnostic module 1. A computer system implementing this method operates as follows. In step 300, a user experiencing a problem with a computer system initiates the diagnostic session. In step 301, an automatic information retrieval is initiated. This information retrieval is performed by the information retrieval module 3, which stores the results of its automatic queries of the computer system, as described above. In step 302, the diagnostic module 1 begins parsing the diagnostic tree 200 contained in the diagnostic tree module 2. The first node selected becomes the current node, and in step 302, the query of the current node is presented to the information retrieval module. In step 303, it is determined whether the information retrieval module 3 was able to answer the query. If the information retrieval module 3 was not able to answer the query, the query is then presented to the user in step 304. In step 306, it is determined whether the user has answered the query or terminated the diagnostic session. If the user has terminated the session, the diagnostic module 1 poses all remaining queries in the current subtree to the information retrieval module 3 to obtain as many answers as it can (Step 307). All responses are then sent to the information report creation module in step 312, and the diagnostic session is terminated in step 314.

If the information retrieval module 3 provides a response to the query posed in step 302, or if the user answers the query posed in step 306, it is then determined whether the current node contains a possible solution in step 305. If the current node contains a possible solution, in step 309 the possible solution is presented to the user, and the diagnostic module 1 waits for the user to implement the proposed solution. At this point, the user may be required to exit the user help system to implement the possible solution, and then re-start or re-enter the user help system to report on the results. In step 311, the user help system determines (either automatically or through user input) whether the possible solution implemented by the user was successful. If the solution worked, the diagnostic session is terminated in step 314.

If the proposed solution was not successful (decision step 311), or if the current node does not contain a proposed solution (decision step 305), the next level of nodes in the diagnostic tree 200 is searched in step 308. In the search conducted in step 308, the diagnostic module attempts to match the query response received in step 303 or step 306 to key words in the nodes in the next level of the diagnostic tree 200. In step 310, it is determined whether a match was found. If no match was found, all responses received to that point are sent to the information report creation module in step 312 and the diagnostic session terminates in step 314. A match may not be found because the responses to the queries have led to a point on the tree where it cannot help the user and the diagnostic module has obtained all the necessary information for that particular problem. In addition, a match will not be found when the end of the diagnostic tree is reached. The responses will then be sent to the information report creation module. If a match is found in step 310, the matched node is designated as the new current node in step 313. The diagnostic module then returns to step 302 to present the new current node's query to the information retrieval module, as the system attempts to obtain an automatic answer to a query before posing the query to the user. Because the diagnostic session results are largely determined by the contents of the diagnostic tree 200, there is a relationship between each node 201 in the diagnostic tree 200, and the information determined from the automatic information retrieval. By selecting the results of the information retrieval through queries 11 from the diagnostic tree 200, a more relevant and useful information 20 report can be created. The technician receiving the information report will be presented with only relevant data. Technician reading time and time spent filtering the data is greatly reduced. Furthermore, bandwidth required to transmit the information report is also significantly reduced, thereby increasing the efficiency of the system, and decreasing the time it takes to send the information report.

Returning to FIG. 1, the responses 12 from the information retrieval module 3, together with the responses 12 from the user 10, and any required information 14 from the diagnostic tree, are sent by the diagnostic module 1 to the information report creation module 4. The information report creation module 4 formulates these various pieces of information into, for example, a single packet of information called an information report 20. The information report creation module 4 creates a packet of information that includes bytes of data stored in computer memory. The information report creation module 4 first creates a header for the information report by setting the initial bits of the information packet to values identifying the information packet as an information report. The information report creation module 4 then writes the information sent by, for example, the information retrieval module 3 into predetermined locations within the information report 20. This information may include, for example, data identifying the computer having the problem 16, the information retrieval responses 15, the user responses 12, the required information 14 listed by the diagnostic tree, and a return path 17 for the answer to the user's problem. The information report creation module then sets the bits at the end of the information packet to signify the end of the information report.

The information report is then forwarded to the information report sending module 5, which sends the information report to the remote technician 18. Depending on how the system is implemented, the information report may be sent, for example, across the Internet (for example, via a Transmission Control Protocol/Internet Protocol (TCP/IP) connection), across a Local Area Network, or to a printer or display system attached to the user's computer system.

Although an embodiment is specifically illustrated and described herein, it will be appreciated that modifications and variations of the present invention are covered by the above teachings and within the purview of the appended claims without departing from the spirit and intended scope of the invention.

What is claimed is:

1. A method for creating an information report for a computer system comprising:

posing a query to obtain a computer information response, said computer information response including status of said computer system;

providing a diagnostic tree having at least one node;

selecting a node on the diagnostic tree based on said computer information response; and based on a characteristic of the node, selecting a portion of computer information.

2. The method of claim 1, further comprising:

creating an information report including the selected portion of the computer information.

3. The method of claim 2, further comprising:

including in the information report a user response.

4. The method of claim 2, wherein:

the selected portion of the computer information includes the computer information response.

5. The method of claim 2, further comprising:

including in the information report at least one characteristic of the node.

6. The method of claim 2, further comprising:

sending the information report to a remote technician.

7. A device for creating an information report for a computer system comprising:

a diagnostic module;

a diagnostic tree module including at least one node of a diagnostic tree; and an information retrieval module; wherein the information retrieval module automatically retrieves computer information;

the diagnostic module queries the information retrieval module to obtain a computer information response, said computer information response including status of said computer system;

the computer information response is used to select a current node of the diagnostic tree;

at least one characteristic of the current node is used to select a portion of the computer information.

8. The device of claim 7, further comprising:

an information report creation module, wherein:

the diagnostic module sends the selected portion of the computer information to the information report creation module;

the information report creation module creates an information report; and the information report includes the selected portion of the computer information.

9. The device of claim 8, wherein the information report is sent to a remote technician.

10. The device of claim 7, wherein the diagnostic tree module is included within the diagnostic module.

11. A storage medium including a set of instructions, said set of instructions capable of being executed by a processor to implement a method for creating an information report for a computer system, the instructions to:

automatically retrieve computer information;

pose a query to obtain a computer information response, said computer information response including status of said computer system;

select a node on a diagnostic tree based on the computer information response; and based on a characteristic of the node, select a portion of the computer information.

12. The storage medium including a set of instructions of claim 11, the instructions to further:

create an information report including the selected portion of the computer information.

13. The storage medium including a set of instructions of claim 12, the instructions to further:

include in the information report the user response.

14. The storage medium including a set of instructions of claim 13, the instructions to further:

include in the information report at least one characteristic of the node.

15. The storage medium including a set of instructions of claim 14, the instructions to further:

send the information report to one of a remote technician and a diagnostic computer.

16. A method for creating an information report for a computer system comprising:

performing an automatic information retrieval to obtain computer information;

posing a query to a memory containing the computer information, said computer information including status of said computer system;

receiving a user response;

selecting a portion of the computer information based on the user response.

17. A method for creating an information report for a computer system comprising:

providing computer information;

posing a query to obtain a computer information response, said computer information response including status of said computer system;

providing a diagnostic tree having at least one node;

selecting a node on the diagnostic tree based on the computer information response; and based on a characteristic of the node, selecting a portion of the computer information.

18. A method for creating an information report for a computer system comprising:

posing a query to obtain a user response;

posing a query to obtain a computer information response, said computer information response including status of said computer system;

providing a diagnostic tree having at least one node;

selecting a node on the diagnostic tree based on one of said user response and said computer information response; and based on a characteristic of the node, selecting a portion of computer information.

19. The method of claim 18, further comprising:

creating an information report including the selected portion of the computer information; and including in the information report a user response and at least one characteristic of the node.

20. The method of claim 19, wherein:

the selected portion of the computer information includes the computer information response.

* * * * *

UNITED STATES PATENT AND TRADEMARK OFFICE
CERTIFICATE OF CORRECTION

PATENT NO. : 6,550,055 B1
DATED : April 15, 2003
INVENTOR(S) : Paul M. Cohen et al.

It is certified that error appears in the above-identified patent and that said Letters Patent is hereby corrected as shown below:

<u>Title page,</u>
Item [54], please change the title from:
"METHOD AND APPARATUS FOR CHEATING AN INFORMATION REPORT RESULTING FROM A DIAGNOSTIC SESSION" to:
-- METHOD AND APPARATUS FOR CREATING AN INFORMATION REPORT RESULTING FROM A DIAGNOSTIC SESSION --

Signed and Sealed this

Eighteenth Day of November, 2003

JAMES E. ROGAN
*Director of the United States Patent and Trademark Office*